(12) United States Patent
Brinkmeyer et al.

(10) Patent No.: US 8,968,443 B2
(45) Date of Patent: Mar. 3, 2015

(54) DELTA P CLOSED LOOP PRESSURE DIAPHRAGM

(71) Applicant: Caterpillar Inc., Peoria, IL (US)

(72) Inventors: Scott D. Brinkmeyer, East Peoria, IL (US); Dereck G. Heffron, Peoria, IL (US); Robert Moore, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/668,443

(22) Filed: Nov. 5, 2012

(65) Prior Publication Data
US 2014/0124060 A1    May 8, 2014

(51) Int. Cl.
*B01D 46/46* (2006.01)
*G01L 9/12* (2006.01)

(52) U.S. Cl.
USPC ................................................ 95/19; 73/718

(58) Field of Classification Search
CPC ..................... B01D 2259/402; B01D 53/0446; G01N 3/42–3/44; G01N 3/00; G01L 9/72; G01L 9/007; G01L 13/025; G01L 7/00; G01L 9/12; G01L 19/04; G01B 7/16–7/18
USPC ................................................. 95/19; 73/718
See application file for complete search history.

(56) References Cited

U.S. PATENT DOCUMENTS

| | | | |
|---|---|---|---|
| 3,017,472 A * | 1/1962 | Wintriss | 200/83 S |
| 5,134,887 A * | 8/1992 | Bell | 73/718 |
| 6,675,655 B2 * | 1/2004 | Broden et al. | 73/716 |
| 7,954,383 B2 * | 6/2011 | Willcox et al. | 73/718 |
| 8,327,713 B2 * | 12/2012 | Willcox | 73/722 |
| 2006/0191258 A1 | 8/2006 | Opris | |
| 2006/0278005 A1 * | 12/2006 | Broden et al. | 73/716 |
| 2007/0000241 A1 | 1/2007 | Funke et al. | |
| 2007/0220985 A1 * | 9/2007 | Hedtke | 73/715 |
| 2009/0138185 A1 | 5/2009 | Klein et al. | |
| 2010/0132473 A1 * | 6/2010 | Willcox | 73/722 |
| 2010/0154370 A1 | 6/2010 | Jensen et al. | |
| 2011/0072789 A1 * | 3/2011 | Konstandopoulos et al. | 60/276 |

* cited by examiner

*Primary Examiner* — Amber Orlando
(74) *Attorney, Agent, or Firm* — Miller, Matthias & Hull LLP

(57) ABSTRACT

A closed loop pressure management system for an exhaust regeneration system is provided with a first tube capable of retaining a first fluid and extending between a proximal end and a distal end, a first fitting coupled between the distal end of the first tube and an exhaust conduit for receiving an exhaust fluid, and a pressure sensor manifold. The first fitting may include a diaphragm configured to provide a sealed interface between the first fluid of the first tube and the exhaust fluid of the exhaust conduit, and communicate the exhaust fluid pressure through the first fluid pressure. The pressure sensor manifold may include at least a first inlet coupled to the proximal end of the first tube and a pressure sensor configured to determine the exhaust fluid pressure based at least partially on the first fluid pressure at the first inlet.

6 Claims, 5 Drawing Sheets

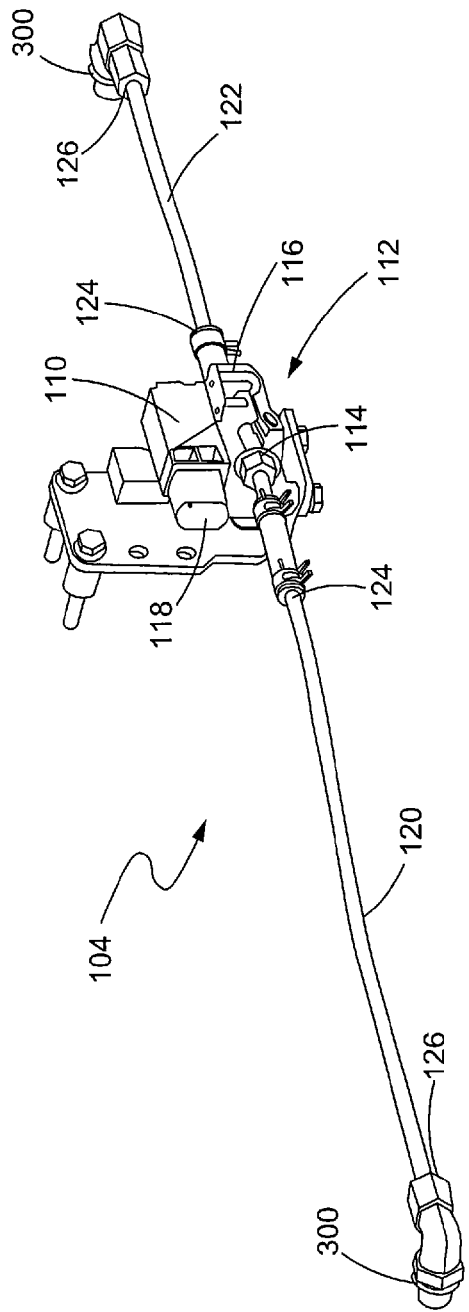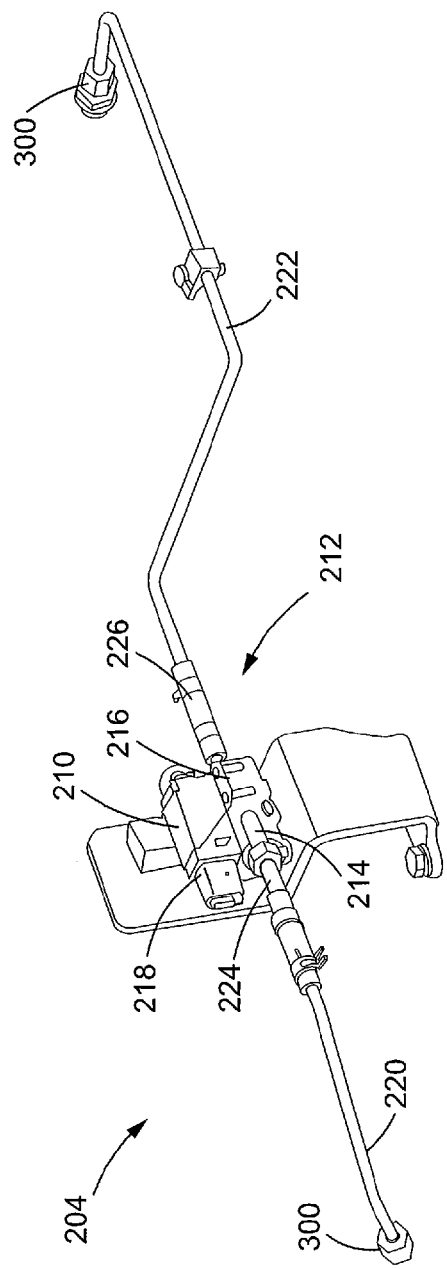

DELTA P CLOSED LOOP PRESSURE DIAPHRAGM

TECHNICAL FIELD

The present disclosure relates generally to particulate filters used with internal combustion engines, and more particularly, to apparatus and methods for monitoring the status of particulate filters.

BACKGROUND

Internal combustion engines generate mechanical energy by burning a mixture of fuel and a source of oxygen, the oxygen generally obtained by the intake of ambient air. In a diesel engine, the combustion process involves burning a mixture of diesel fuel and air, which results in the generation of exhaust, which includes exhaust gases and particulate matter. The particulate matter is often referred to as soot. The exhaust, including the particulate matter, is exhausted from the diesel engine through an exhaust system. A diesel particulate filter (DPF) is often employed as part of the exhaust system in order to filter all or most of the soot from the exhaust before the exhaust is released from the exhaust system.

Over time, particulate matter trapped by the filter can accumulate in the filter and reduce the operating efficiency of the associated engine. Specifically, a substantially clogged filter can increase the back pressure to the engine and hinder the ability of the engine to discharge waste exhaust gases. As a result, the engine must consume more fuel and work harder to produce the same amount of power as compared to when the filter is free of accumulated particulates. Accordingly, exhaust regeneration systems are often employed to periodically clean the filter. Such regeneration systems generally free the filter of particulates by heating the particulates to temperatures sufficient to combust or vaporize the particulates.

Exhaust regeneration systems may use any one of a variety of different ways to determine if such cleaning of the filter is necessary. One method involves monitoring the pressure differential across the filter to determine if the back pressure indicates excessive soot loading. More specifically, the pressure differential is typically measured using pressure sensors that are coupled to each of the upstream and downstream conduits, located before and after the particulate filter, through relatively narrow tubes which place the pressure sensors in direct fluid communication with exhaust gases entering and exiting the filter. If the back pressure, or the pressure of gases detected within the conduit located upstream of the filter, is significantly greater as compared to that of the downstream conduit, the pressure sensor may produce an electrical signal to an electronic control unit (ECU), or the like, to suggest filter regeneration.

Currently existing systems place the pressure sensors substantially in direct line with the exhaust gases passing through the particulate filter. Although fairly accurate, such exposure allows soot, water, ice, and the like, to build up within and clog the tubes or lines leading to the sensors over time. Excessive build up and clogging of the pressure sensor lines can cause significant errors in pressure readings if not complete mechanical and/or electrical failure of the sensors. Such setbacks can prevent prompt alert for the need to clean or regenerate the filter, which can further result in inefficient engine performance and excess fuel consumption. Similarly, repairs for unclogging the pressure sensor lines or for replacing the pressure sensor assembly can cause additional downtime and costs.

The present disclosure is directed to overcoming one or more of the problems associated with the prior art exhaust regeneration systems identified above.

SUMMARY OF THE DISCLOSURE

In one aspect of the present disclosure, a pressure management system for an exhaust regeneration system is provided. The pressure management system may include a first tube capable of retaining a first fluid and extending between a proximal end and a distal end, a first fitting coupled between the distal end of the first tube and an exhaust conduit for receiving an exhaust fluid, and a pressure sensor manifold. The first fitting may include a first diaphragm configured to provide a sealed interface between the first fluid of the first tube and the exhaust fluid of the exhaust conduit, and communicate a pressure of the exhaust fluid through a pressure of the first fluid. The pressure sensor manifold may include at least a first inlet coupled to the proximal end of the first tube and a pressure sensor configured to determine the pressure of the exhaust fluid based at least partially on the pressure of the first fluid at the first inlet.

In another aspect of the present disclosure, an exhaust regeneration system is provided. The exhaust regeneration system may include a particulate filter disposed between an upstream exhaust conduit and a downstream exhaust conduit, and a pressure sensor manifold. The pressure sensor manifold may include an upstream inlet, a downstream inlet and a pressure sensor configured to detect a pressure at each of the upstream and downstream inlets. The upstream inlet may be coupled to the upstream exhaust conduit via a first fitting, and the downstream inlet may be coupled to the downstream exhaust conduit via a second fitting. Each of the first and second fittings may include a diaphragm configured to provide a sealed interface between one of the exhaust conduits and the corresponding one of the inlets, and communicate a pressure therebetween.

In yet another aspect of the present disclosure, a method for monitoring pressure across a particulate filter is provided. The method may include the steps of providing a first diaphragm that is sealably disposed between an upstream exhaust conduit and a first volume and configured to communicate a pressure of an upstream exhaust fluid within the upstream exhaust conduit through a first fluid within the first volume; providing a second diaphragm sealably disposed between a downstream exhaust conduit and a second volume and configured to communicate a pressure of a downstream exhaust fluid within the downstream exhaust conduit through a second fluid within the second volume; monitoring pressures of the first and second fluids within the corresponding first and second volumes; and determining a pressure differential across the upstream and downstream exhaust conduits based on a comparison of the pressures in the first and second volumes.

BRIEF DESCRIPTION OF THE DRAWINGS

FIG. 5 is a graphical view of the pressure monitoring system of the embodiment of FIGS. 1 and 2;

FIG. 6 is a graphical view of the pressure monitoring system of the embodiment of FIGS. 3 and 4;

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
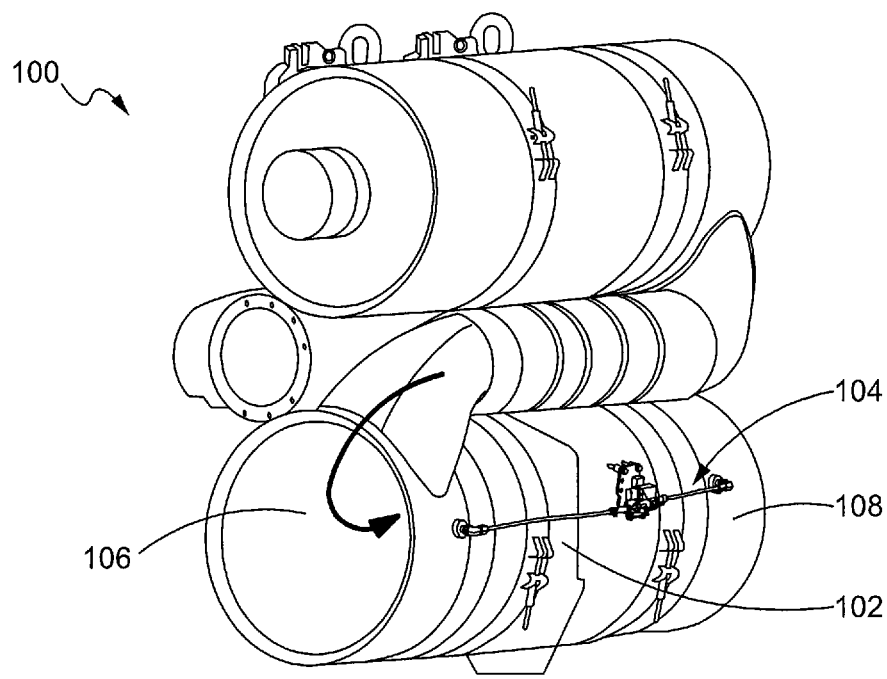
FIG. 1 is a graphical view of one exemplary exhaust regeneration system having a particulate filter and pressure monitoring system constructed in accordance with the teachings of the present disclosure.
Figure 2:
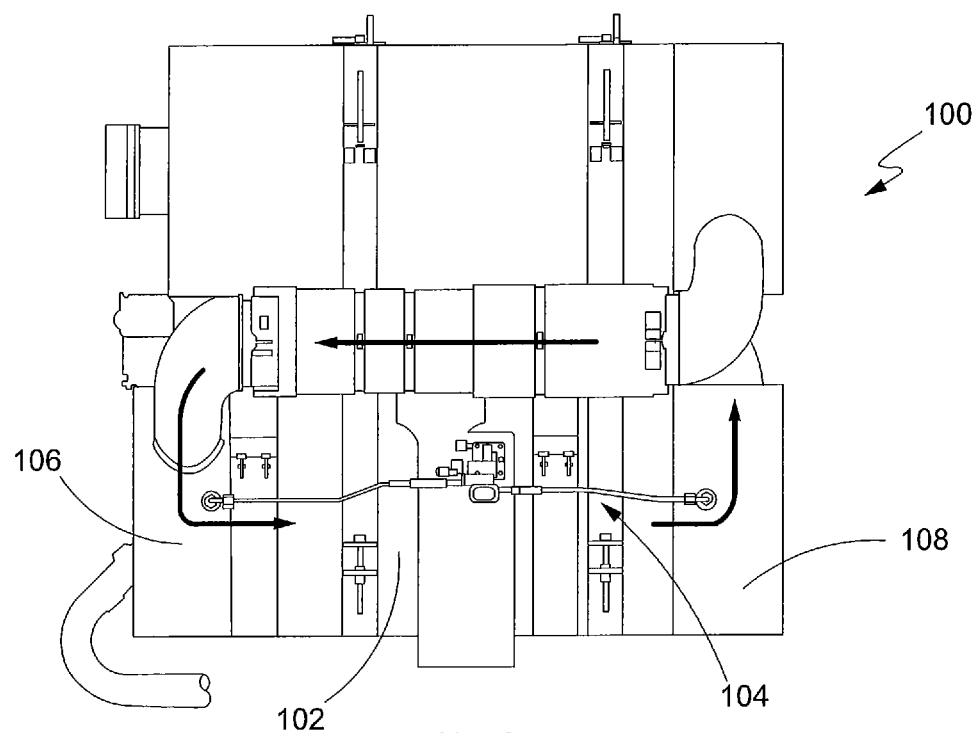
FIG. 2 is another graphical view of the exhaust regeneration system of FIG. 1.

FIGS. 1 and 2 illustrate one exemplary embodiment of an exhaust regeneration system 100 having a particulate filter 102 and a closed loop pressure management system 104 configured to monitor the differential pressure across the particulate filter 102. The exhaust regeneration system 100 may be used in conjunction with one or more engines, such as diesel engines, gasoline engines, natural gas engines, or other any types of engines commonly used in the art which exhaust air pollutants. The particulate filter 102 may serve to filter air pollutants and any other particulates from waste gases that are exhausted by the associated engine. Moreover, the particulate filter 102 may employ diesel particulate filters (DPF), selective catalytic reduction (SCR) catalysts, diesel oxidation catalysts (DOC), or any other fluid filter commonly used in the art to filter pollutants from exhaust gases.

Figure 3:
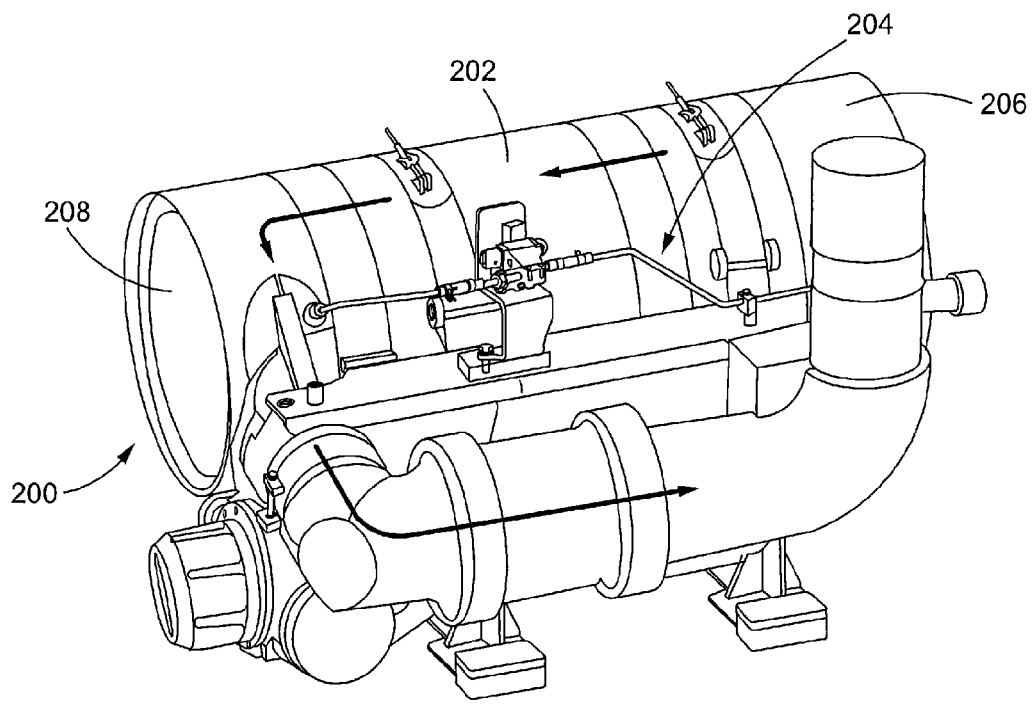
FIG. 3 is a graphical view of another exemplary exhaust regeneration system having a particulate filter and pressure monitoring system constructed in accordance with the teachings of the present disclosure.
Figure 4:
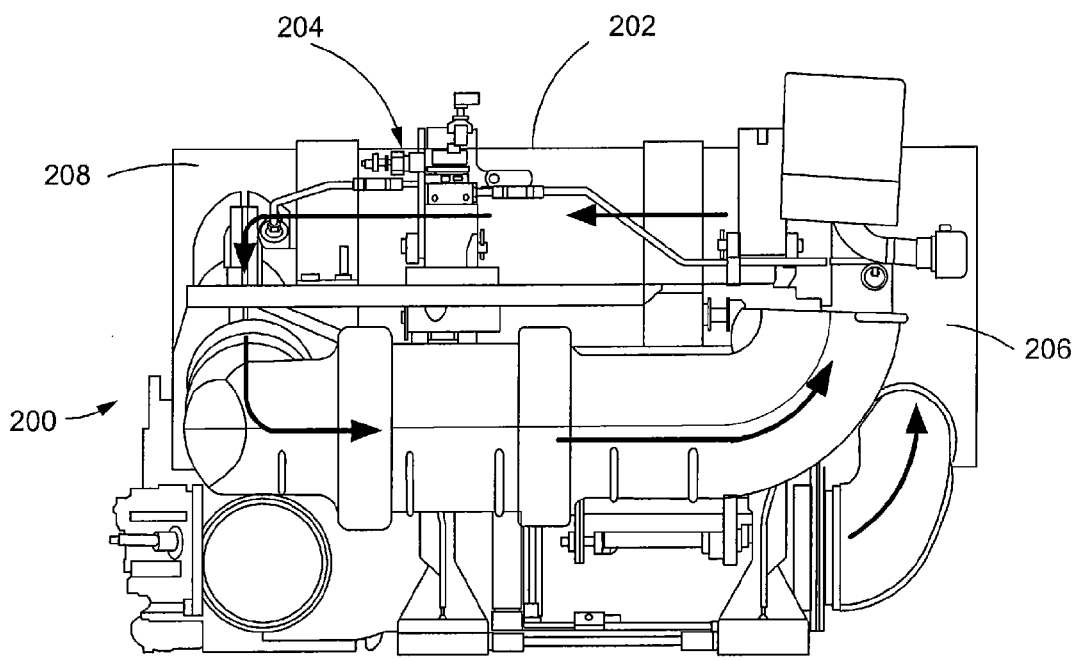
FIG. 4 is another graphical view of the exhaust regeneration system of FIG. 3.

Similarly, the embodiment of FIGS. 3 and 4 illustrate another exhaust regeneration system 200 having essentially the same components in one variant configuration. For example, the exhaust regeneration 200 of FIGS. 3 and 4 similarly may include a particulate filter 202 and a closed loop pressure management system 204 configured to monitor the differential pressure thereacross. As in the embodiment of FIGS. 1 and 2, the exhaust regeneration system 200 may be used in conjunction with diesel engines, gasoline engines, natural gas engines, or other any types of engines commonly used in the art which exhaust air pollutants, while the particulate filter 202 may be configured to trap air pollutants and particulates from gases that are exhausted by the engine. The exhaust regeneration systems 100, 200 may be applied for different types of vehicles, machinery, and the like. Modifications or configurations other than those shown in FIGS. 1-4 will be apparent to those skilled in the art without departing from the scope of the present disclosure.

As shown by the arrows indicated in FIGS. 1-4, unfiltered exhaust fluids or gases may flow into the particulate filter 102, 202 from a first or an upstream conduit 106, 206, pass through various filter media disposed within the filter 102, 202, and exit the filter 102, 202 through a second or a downstream conduit 108, 208. Over time, as more pollutants, soot, and other trapped particulates accumulate in the filter 102, 202, the flow of exhaust gases through the exhaust system 100, 200 may become increasingly more restricted by the congested filter 102, 202. This restriction may further cause a notable increase in pressure, or back pressure, within the upstream conduit 106, 206 as well as a corresponding decrease in pressure within the downstream conduit 108, 208. Operating an engine against such back pressure may result in unnecessary fuel consumption and less overall efficiency. Accordingly, it is advantageous to regenerate the filter 102, 202 as soon as significant back pressures are formed or prior to such conditions.

Turning to FIG. 5, the closed loop pressure management system 104 of the exhaust regeneration system 100 of FIGS. 1 and 2 is disclosed in more detail. The pressure management system 104 may be adapted to monitor pressures of different volumes within the exhaust regeneration system 100, such as a differential pressure across the particulate filter 102, for at least the purpose of monitoring the condition of the particulate filter 102 and signaling when regeneration of the filter 102 is appropriate. As shown, the pressure management system 104 may essentially include a pressure sensor 110 that is disposed within a pressure sensor manifold 112 having one or more inlets, such as a first inlet 114 and a second inlet 116. More specifically, the pressure sensor 110 may be configured to detect a pressure at each of the inlets 114, 116 and/or calculate a differential pressure therebetween. Information corresponding to the pressure detected at the inlets 114, 116, or differential pressures therebetween, may be communicated, such as via an electronic signal, through a communication port 118 to an electronic control unit (ECU) or any other relevant controlling or processing device.

Furthermore, the pressure management system 104 may provide one or more inlet lines or tubes, such as a first tube 120 and a second tube 122, which may be respectively coupled to the first and second inlets 114, 116 of the pressure sensor manifold 112. Each of the first and second inlet tubes 120, 122 may extend between a proximal end 124, which is coupled to one of the inlets 114, 116 of the pressure sensor manifold 112, and a distal end 126, which is coupled to one of the upstream and downstream conduits 106, 108 of the associated particulate filter 102. For example, the proximal end 124 of the first tube 120 may be coupled to the first inlet 114, while the distal end 126 of the first tube 120 may be coupled to the upstream conduit 106 of the particulate filter 102 of FIGS. 1 and 2. Correspondingly, the proximal end 124 of the second tube 122 may be coupled to the second inlet 116 of the pressure sensor manifold 112, while the distal end 126 of the second tube 122 may be coupled to the downstream conduit 108 of the particulate filter 102.

Similarly, the closed loop pressure management system 204 of the exhaust regeneration system 200 of FIGS. 3 and 4 is provided in more detail in FIG. 6. As with the pressure management system 104 of FIG. 5, the pressure management system 204 may be adapted to monitor pressures of different volumes within the exhaust regeneration system 200, such as a differential pressure across its particulate filter 202. The pressure management system 204 may provide a pressure sensor 210 within a pressure sensor manifold 212 having first and second inlets 214, 216. The pressure sensor 210 may be configured to detect a pressure at each of the inlets 214, 216 and/or calculate a differential pressure therebetween. Similar to the pressure sensor of 110 of FIG. 5, information corresponding to the pressure detected at the inlets 214, 216 in FIG. 6 may be communicated through the communication port 218 provided.

The pressure management system 204 may optionally or additionally include first and second inlet lines or tubes 220, 222, which may be respectively coupled to the first and second inlets 214, 216 of the pressure sensor manifold 212. Each of the first and second inlet tubes 220, 222 may extend between a proximal end 224 that is coupled to one of the inlets 214, 216 of the pressure sensor manifold 212, and a distal end 226 that is coupled to one of the upstream and downstream conduits 206, 208 of the particulate filter 202 associated therewith. In the embodiments shown in FIGS. 3 and 4, for example, the proximal end 224 of the first tube 220 may be coupled to the first inlet 214, while the distal end 226 of the first tube 220 may be coupled to the upstream conduit 206 of the particulate filter 202. The proximal end 224 of the second tube 222 may further be coupled to the second inlet 216 of the pressure sensor manifold 212, while the distal end 226 of the second tube 222 may be coupled to the downstream conduit 208 of the particulate filter 202.

Figure 8:
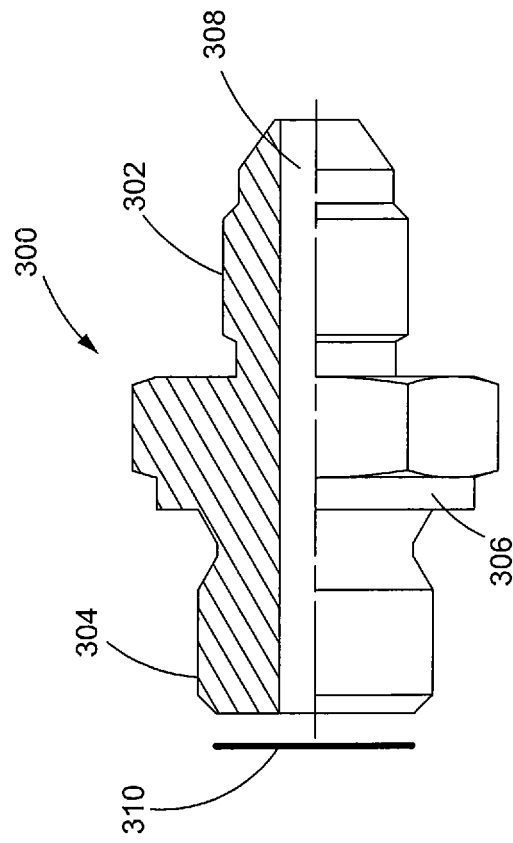
FIG. 8 is a side schematic view of the fitting and associated diaphragm of FIG. 7.
Figure 7:
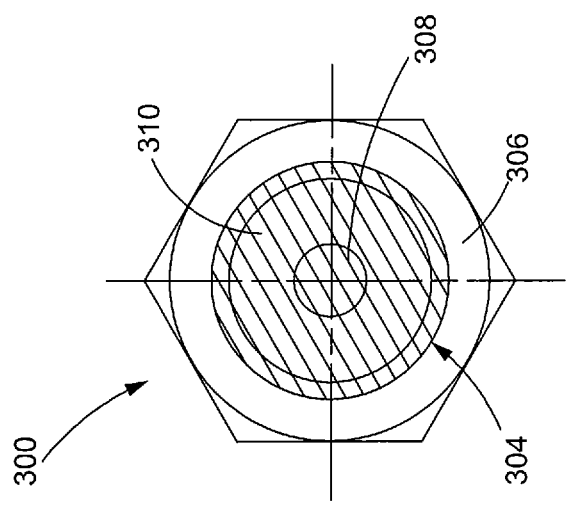
FIG. 7 is a schematic view of one exemplary fitting and associated diaphragm.

Each of the distal ends 126, 226 of the inlet tubes 120, 122, 220, 222 may be coupled to the corresponding conduit 106, 108, 206, 208 though a fitting 300, as shown for example in FIGS. 7 and 8. The fitting 300 may be formed of a generally solid material such as steel or any other suitable metal or combinations thereof. Each of the first and second ends 302, 304 of the fitting 300 may be appropriately configured to provide a sufficiently secure fitment with either the generally polymeric tubes 120, 122, 220, 220 or the generally metallic conduits 106, 108, 206, 208. For example, the outer surface of the first end 302 of the fitting 300 may be appropriately machined and shaped to be sufficiently secured within the distal ends 126, 226 of the tubes 120, 122, 220, 222 through a friction fit, while the outer surface of the second end 304 of the fitting 300 may be machined with an externally threaded surface to be secured within an internally threaded aperture of the conduits 106, 108, 206, 208. The fitting 300 may additionally include one or more washers 306, or the like, formed of a relatively malleable material, such as copper, to further secure fitment with the conduits 106, 108, 206, 208.

The fitting 300, as shown in FIGS. 7 and 8, may be provided with an aperture 308 axially and fully extending between the first and second ends 302, 304. The fitting 300 may further be provided with a diaphragm 310 that is transversely disposed across the aperture 308. As shown in FIGS. 7 and 8, for example, the diaphragm 310 may be welded or otherwise sealably affixed to the second end 304 of the fitting 300. In other alternative modifications or variations, the diaphragm 310 may be transversely disposed across the aperture 308 at the first end 302 or disposed across any other cross-section of the fitting 300. Moreover, the diaphragm 310 may be configured to seal a fluid, that may be contained within the aperture 308 of the fitting 300 and a connected inlet tube 120, 122, 220, 222, from an exhaust fluid flowing through a conduit 106, 108, 206, 208 attached at the second end 304 so as to provide a completely closed detection system.

The diaphragm 310 may be formed of a material that is sufficiently rigid and capable of maintaining a seal under extreme temperatures and pressures, but also sufficiently flexible so as to allow pressure from within an attached conduit 106, 108, 206, 208 to interface or communicate with pressure enclosed within inlet tubes 120, 122, 220, 222. Specifically, the diaphragm 310 may be made to be at least partially movable, for instance expandable and contractible, within the aperture 308 of the fitting 300 in response to changes in pressure within the conduits 106, 108, 206, 208. Moreover, the diaphragm 310 may enable a change in the pressure of exhaust fluids flowing through a connected conduit 106, 108, 206, 208 to effect a change in volume within the conduit 106, 108, 206, 208, which further effects a corresponding change in volume and pressure within the aperture 308 of the fitting 300. For example, an increase in exhaust pressure within a conduit 106, 108, 206, 208 coupled to the second end 304 of the fitting 300 in FIG. 8 may cause the diaphragm 310 to expand and generally move within the aperture 308 toward the first end 302. The decrease in volume and corresponding increase in pressure within the aperture 308 and a connected inlet tube 120, 122, 220, 222 may be detected by the pressure sensor 110, 210 and assumed as the pressure within the associated conduit 106, 108, 206, 208.

Figure 9:
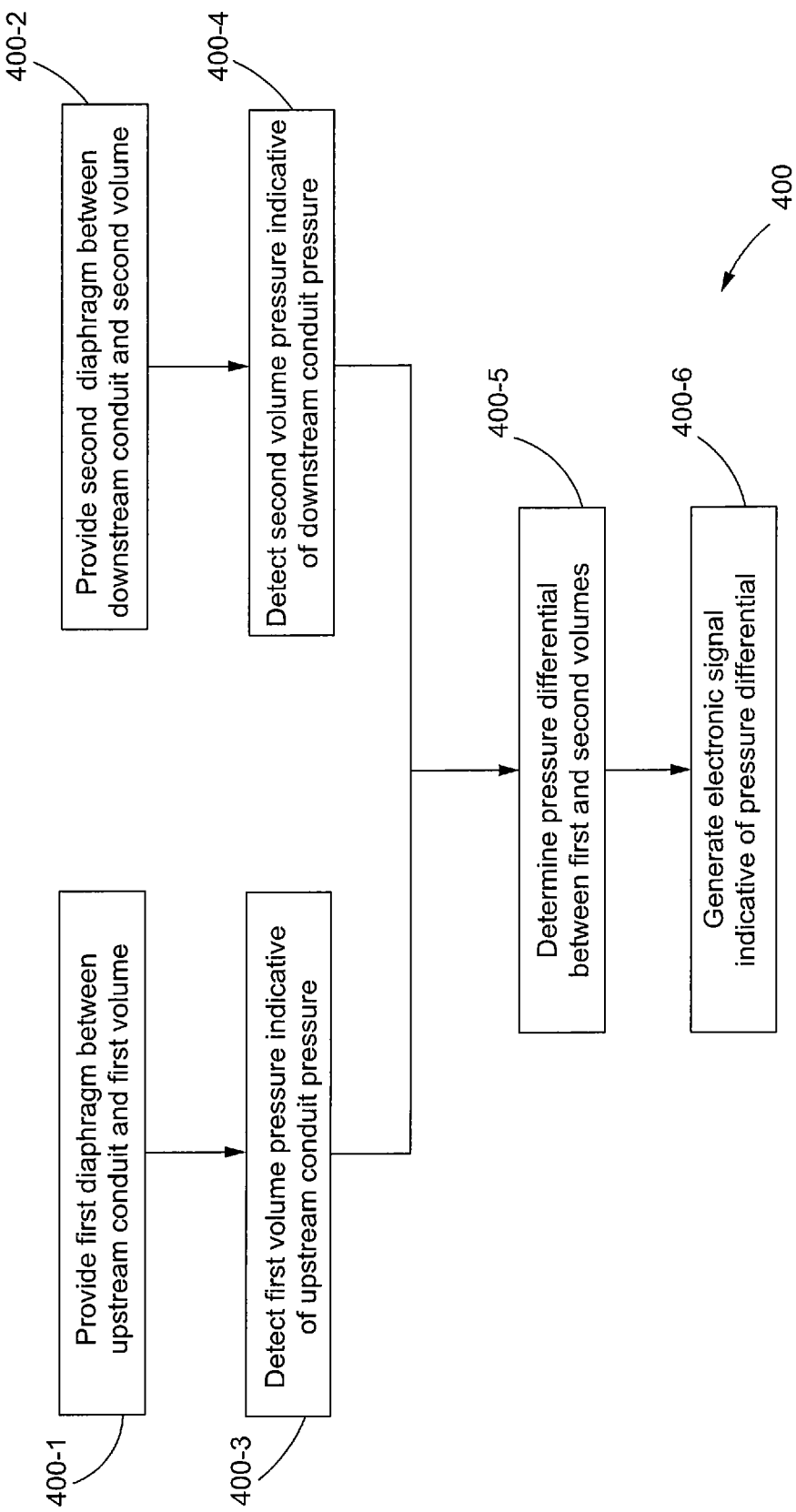
FIG. 9 is a diagrammatic view of one exemplary method for monitoring pressure across a particulate filter.

Turning now to FIG. 9, one exemplary method 400 for monitoring pressure across a particulate filter 102, 202 is provided. In an initial step 400-1, a diaphragm 310, such as the one in FIGS. 7 and 8 may be disposed between a first or an upstream conduit 106, 206 and a first volume, for example, the closed volume of fluid that is contained within a first inlet tube 120, 220 and held in communication with an inlet 114, 214 of the pressure sensor 110, 210. Similarly, in a concurrent step 400-2, a second diaphragm 310 may be positioned between a second or a downstream conduit 108, 208 and a second volume of fluid, for example, the closed volume of fluid that is contained within a second inlet tube 122, 222 and held in communication with a second inlet 116, 216 of the pressure sensor 110, 210. As previously discussed with respect to FIGS. 7 and 8, the diaphragm 310 may be provided by installing the fitting 300, to which the diaphragm 310 is attached, directly in communicable line between each conduit 106, 108, 206, 208 and the corresponding inlet 114, 116, 214, 216 to the pressure sensor 110, 210. Moreover, the diaphragm 310 may be configured to both seal the exhaust fluid from each of the first and second volumes, while simultaneously interfacing or communicating changes in pressure within the conduits 106, 108, 206, 208 to the corresponding first and second volumes.

In step 400-3, the pressure within the first volume, for example, corresponding to the pressure within the upstream conduit 106, 206, may be detected by the pressure sensor 110, 210. Similarly, the pressure within the second volume, for example, corresponding to the pressure within the downstream conduit 108, 208, may be detected by the pressure sensor 110, 210 in step 400-4. In step 400-5, a pressure differential between the first and second volumes, and thus representative of a pressure differential between the upstream and downstream conduits 106, 108, 206, 208, may be determined based on the pressures detected in steps 400-3 and 400-4. A single pressure sensor 110, 210 may be employed to detect the individual pressure in each of the inlets 114, 116, 214, 216, as well as determine a pressure differential therebetween. In other modifications, more than one pressure sensor may be employed to independently detect the pressure in each of the first and second inlets 114, 116, 214, 216. In such configurations, a controller, processor, or the like, may be used to calculate the pressure differential based on the individually detected pressures.

Additionally, in step 400-6, information corresponding to the pressure differential determined in step 400-5 may be communicated through electronic signals to a controller, processor, or the like. Such signals may be communicated via the communication port 118, 218 of FIGS. 5 and 6 for example. Upon receipt of such signals, a controller associated with the exhaust regeneration system 100 may determine if the pressure differential is within an acceptable range and indicative of a healthy particulate filter 102, 202. If the pressure differential exceeds predefined thresholds and indicates a substantially clogged and inefficient particulate filter 102, 202, the controller may take appropriate measures to resolve the condition. For example, if the controller determines there is back pressure within the upstream conduit 106, 206, such that the pressure therein is detected to be substantially greater than the pressure within the downstream conduit 108, 208, the controller may automatically initiate regeneration of the filter 102, 202 or provide alerts or notifications indicating the need for such regeneration.

Industrial Applicability

In general, the foregoing disclosure finds utility in any suitable exhaust system having a particulate filter. The foregoing disclosure more particularly finds utility in various industrial applications, such as the farming, construction and mining industries in providing smoother and more efficient control of machines typically used in association with work vehicles and/or machines, such as tractors, backhoe loaders, compactors, feller bunchers, forest machines, industrial loaders, skid steer loaders, wheel loaders, and the like.

Moreover, the present disclosure finds utility in any application for monitoring the condition of particulate filter and is not limited to exhaust systems with filter regeneration capabilities. Specifically, the disclosed systems and methods provide the ability to monitor pressures across a particulate filter for the purposes of determining the condition of the filter, without directly exposing the pressure sensors to the exhaust fluids or gases. By providing a fitting with a diaphragm directly in between the pressure sensors and the exhaust conduits, the pressure sensors are sealed and protected from exhaust gases, particulates, soot, water, ice, and the like.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A pressure management system for an exhaust regeneration system having a particulate filter disposed between an upstream exhaust conduit and a downstream exhaust conduit and through which flows an exhaust fluid, the pressure management system comprising:
    a first tube retaining a first fluid and extending between a proximal end and a distal end;
    a second tube retaining a second fluid and extending between a proximal end and a distal end;
    a first fitting having:
        a first end coupled to the distal end of the first tube;
        a second end coupled to the upstream exhaust conduit;
        a first aperture extending from the first end to the second end of the first fitting; and
        a first diaphragm extending across the aperture of the first fitting to provide a sealed interface between the first fluid of the first tube and the exhaust fluid of the upstream exhaust conduit, the first diaphragm being formed of a flexible material sufficiently durable to withstand pressures and particulate matter associated with the exhaust fluid, the first diaphragm being configured to expand toward the first tube in response to an increased pressure of the exhaust fluid at the upstream exhaust conduit, and the first fluid being configured to compress from an initial volume to a decreased volume in response to expansion of the first diaphragm so that a pressure of the first fluid corresponds to a pressure of the exhaust fluid in the upstream exhaust conduit;
    a second fitting having:
        a first end coupled to the distal end of the second tube;
        a second end coupled to the downstream exhaust conduit;
        a second aperture extending from the first end to the second end of the second fitting; and
        a second diaphragm extending across the aperture of the first fitting to provide a sealed interface between the second fluid of the second tube and the exhaust fluid of the downstream exhaust conduit, the second diaphragm being formed of a flexible material sufficiently durable to withstand pressures and particulate matter associated with the exhaust fluid, the second diaphragm being configured to expand toward the second tube in response to an increased pressure of the exhaust fluid at the downstream exhaust conduit, and the second fluid being configured to compress from an initial volume to a decreased volume in response to expansion of the second diaphragm so that a pressure of the second fluid corresponds to a pressure of the exhaust fluid in the downstream exhaust conduit;
    a pressure sensor manifold having a first inlet coupled to the proximal end of the first tube, a second inlet coupled to the proximal end of the second tube, and a pressure sensor configured to determine pressures of the exhaust fluid in the upstream and downstream exhaust conduits based at least partially on the pressures of the first and second fluids at the first and second inlets.

2. The pressure management system of claim 1, wherein the first diaphragm is welded onto the first fitting and the second diaphragm is welded onto the second fitting.

3. The pressure management system of claim 1, wherein the first diaphragm is configured to cause a change in volume of the first fluid in proportion to a change in pressure within the exhaust conduit.

4. The pressure management system of claim 3, wherein the pressure sensor is configured to derive the change in pressure within the exhaust conduit based on a change in pressure detected within the first tube.

5. The pressure management system of claim 1, wherein the pressure sensor is configured to generate an electronic signal corresponding to the pressure of the exhaust fluid based on the pressure detected at the first inlet.

6. The pressure management system of claim 1, wherein the pressure sensor is configured to determine a pressure differential across the particulate filter based on a comparison between the pressures of the first and second fluids.

* * * * *

UNITED STATES PATENT AND TRADEMARK OFFICE
CERTIFICATE OF CORRECTION

PATENT NO. : 8,968,443 B2  
APPLICATION NO. : 13/668443  
DATED : March 3, 2015  
INVENTOR(S) : Brinkmeyer et al.

It is certified that error appears in the above-identified patent and that said Letters Patent is hereby corrected as shown below:

IN THE SPECIFICATION

Column 7, line 1, delete "Industrial Applicability" and insert -- INDUSTRIAL APPLICABILITY --.

Signed and Sealed this
Twenty-second Day of December, 2015

Michelle K. Lee
*Director of the United States Patent and Trademark Office*